H. A. CAMPBELL.
HARROW.
APPLICATION FILED JUNE 28, 1910.

972,057.

Patented Oct. 4, 1910.
2 SHEETS—SHEET 1.

Witnesses
E. Larson
Charles A. Wilson

Inventor
Henry A. Campbell
By Beeler & Robb
Attorneys

H. A. CAMPBELL.
HARROW.
APPLICATION FILED JUNE 28, 1910.

972,057.

Patented Oct. 4, 1910.
2 SHEETS—SHEET 2.

Witnesses
E. Larson
Charles H. Wilson

Inventor
Henry A. Campbell
By Beeler & Robb
Attorney

UNITED STATES PATENT OFFICE.

HENRY ALVIN CAMPBELL, OF ROLETTE, NORTH DAKOTA.

HARROW.

972,057.  Specification of Letters Patent.  Patented Oct. 4, 1910.

Application filed June 28, 1910. Serial No. 569,329.

*To all whom it may concern:*

Be it known that I, HENRY ALVIN CAMPBELL, a citizen of the United States, residing at Rolette, in the county of Rolette and State of North Dakota, have invented certain new and useful Improvements in Harrows, of which the following is a specification.

This invention relates to harrows and is designed particularly to construct a harrow which will be composed of a plurality of individual harrows, each of which may be lifted independently of the remaining harrows for the removal of weeds and the like which accumulate about the teeth thereof.

It contemplates the construction of a device of this nature wherein either of a pair of toothed harrows may be raised independently of the other by the same lever.

With the above and other objects in view, this invention consists in the construction, combination, and arrangement of parts, all as hereinafter more fully described, claimed, and illustrated in the accompanying drawings, wherein—

Figure 1:
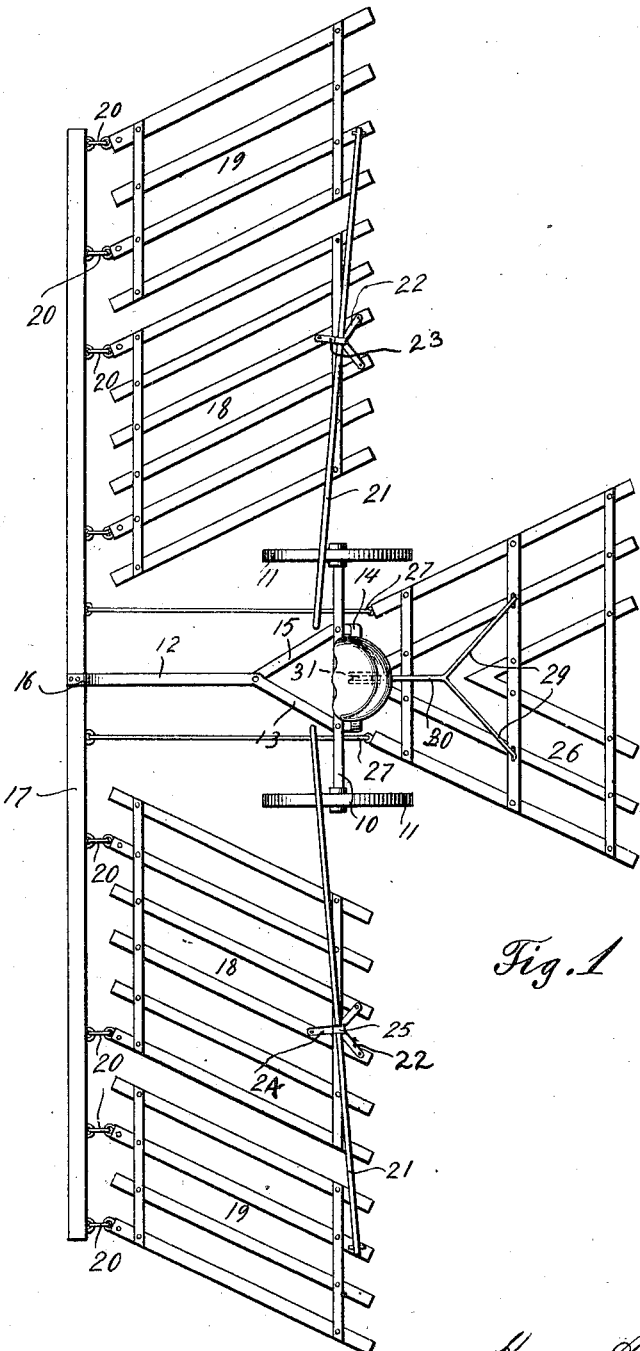
Figure 2:
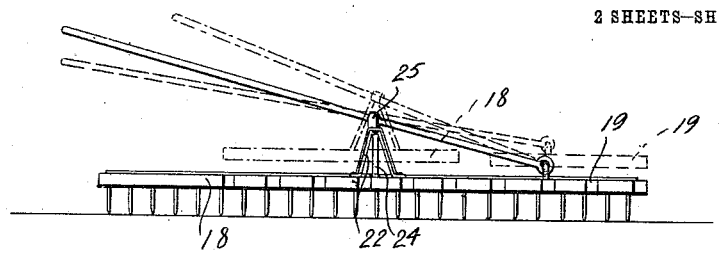
Figure 3:
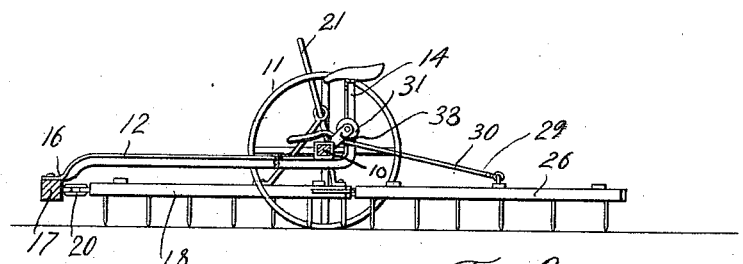
Figure 4:
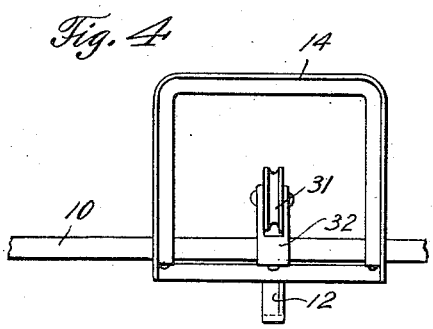
Figure 6:
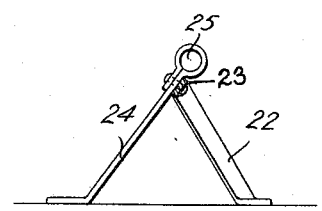
Figure 5:
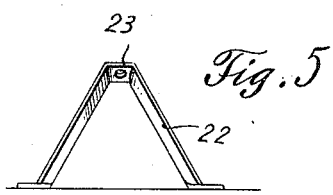

Figure 1 is a top plan view of a harrow constructed in accordance with the present invention; Fig. 2 is a rear elevation of one side thereof illustrating in dotted lines a manner in which either of the two frames may be raised by the same lever; Fig. 3 is a central section of the harrow, parts thereof being illustrated in elevation; Fig. 4 is a rear elevation of the axle and arch illustrating the pulley for raising the central harrow frame. Figs. 5 and 6 are detail elevations of the tripods carried by the inner harrow frame.

The harrow forming the subject-matter of the present invention embodies a transverse draft bar to the rear side of which is centrally secured a harrow cart. Disposed on each side of the harrow cart and pivotally connected to the transverse bar are a pair of toothed harrow frames, there being secured to each pair a lever which extends inwardly to the harrow cart, said lever adapted to raise either of said frames independently. A similar toothed harrow is located to the rear of said harrow cart in such a manner that the path of said harrow overlaps the path of the side harrows slightly in order that the entire surface of the ground between the extremities of the side harrows may be thoroughly operated upon. A cam lever is disposed below the seat carried by the harrow cart and is adapted to raise and lower said central harrow at the will of the operator.

Referring more particularly to the drawings the present invention embodies an axle 10 having rotatably mounted thereon at each extremity a wheel 11, said wheel and axle being of any suitable construction. The tongue 12 formed of an angle bar is bent at its rear terminal to form the arm 13, after which it is bent upwardly forming the seat arch 14 and thence downwardly under the axle forming the arm 15, said arm being bolted at its free terminal to the tongue 12 adjacent to the arm 13. The arms 13 and 15 are secured to the axle adjacent to the seat arch 14, thereby firmly securing the tongue and the seat arch to the axle. The forward terminal of the tongue is bent downwardly as at 16 and has secured thereto the transverse draft bar 17. On each side of the tongue 16 are pivotally connected the inner harrow frames 18 and the extreme harrow frames 19, said frames being secured to the draft bar by the links 20. A lever 21 is mounted on one of the longitudinal bars of each extreme frame 19 and extends inwardly toward the seat arch 14, each lever being loosely mounted in a tripod secured centrally to each inner frame 18. From this construction it will be readily understood that when a downward pressure is exerted on the inner terminals of the levers 21 the tripods will act as fulcrums for said levers and cause the extreme harrow frames 19 to be elevated in order that the weeds and the like accumulated on the teeth thereof may be removed. To elevate the inner frames 18 a pull is exerted on the inner terminals 21 thereby causing the pivotal connection between the levers 21 and the extreme frames 19 to act as a fulcrum, thereby lifting the inner frames 18 through the instrumentality of the tripods 21. The tripod heretofore referred to comprises a main supporting U-shaped strap 22 so arranged on the frames 19 that the same is secured to the two central longitudinal bars of said frames and has at the junction of the supporting arms thereof a flat bearing surface 23. An auxiliary support 24 is secured to one of the central bars of each frame 19 and is riveted to the flat bearing portion 23 of the strap 22 forming a circular bearing loop 25, through which one of the levers 21 projects.

The central frame 26 which operates to the rear of the harrow cart is connected to the draft bar 17 by the links 27 which engage eyes on the draft bar 17. A transverse flexible member 29 is secured to the harrow frame 26 and has centrally fastened thereto the elevating flexible member 30 which extends under the seat arch 14 where it is secured to a pulley 31 removably mounted on the axle 10 by the bracket 32 to which it is pivoted.

Having thus fully described my invention, what is claimed as new is:

1. In a device of the class described, the combination with a harrow cart, of a transverse draft bar secured thereto, a plurality of harrow frames connected to said draft bar on each side of said harrow cart, and a centrally disposed harrow frame adapted to operate to the rear of said harrow cart, the path of said central harrow frame adapted to overlap the paths of said side frames.

2. In a device of the class described, the combination with a harrow cart, having a forwardly extending tongue, of a transverse draft bar carried at the outer terminal of said forwardly extending tongue, a plurality of toothed harrow frames pivotally secured to said draft bar on each side of said cart, a central harrow frame adapted to operate in the rear of said cart, and means whereby the inner of said frames secured to said draft bar may be raised independently of the outer frames and vice versa.

3. In a device of the class described, the combination with a harrow cart, having a forwardly extending tongue, of a transverse draft bar carried at the outer terminal of said forwardly extending tongue, a plurality of toothed harrow frames pivotally secured to said draft bar on each side of said cart, a central harrow frame adapted to operate in the rear of said cart, means whereby the inner of said frames secured to said draft bar may be raised independently of the outer frames and vice versa, and means whereby the central frame may be lifted independently of said side frames.

4. In a device of the class described, the combination with a harrow cart, having a forwardly extending tongue, of a transverse draft bar carried at the outer terminal of said forwardly extending tongue, a plurality of toothed harrow frames pivotally secured to said draft bar on each side of said cart, a central harrow frame adapted to operate in the rear of said cart, a lever pivoted to each extreme frame carried by said draft bar, and means whereby said lever may operate on the inner of said frames.

5. In a device of the class described, the combination with a harrow cart, having a forwardly extending tongue, of a transverse draft bar carried at the outer terminal of said forwardly extending tongue, a plurality of toothed harrow frames pivotally secured to said draft bar on each side of said cart, a central harrow frame adapted to operate in the rear of said cart, a lever pivoted to each extreme frame carried by said draft bar, and a tripod carried by each of the inner of said frames adapted to form a bearing for said lever.

In testimony whereof I affix my signature in presence of two witnesses.

HENRY ALVIN CAMPBELL.

Witnesses:
 FRANK FITZHARRIS,
 LOUIS DUPUIS.